United States Patent [19]

Ohta

[11] Patent Number: 5,381,017
[45] Date of Patent: Jan. 10, 1995

[54] CASSETTE FOR RADIATION IMAGE STORAGE PANELS

[75] Inventor: Yasunori Ohta, Kanagawa, Japan

[73] Assignee: Fuji Photo Film Co., Ltd., Kanagawa, Japan

[21] Appl. No.: 172,163

[22] Filed: Dec. 23, 1993

[30] Foreign Application Priority Data

Dec. 25, 1992 [JP] Japan .................. 4-345919

[51] Int. Cl.⁶ .................. G03B 42/02; G03B 42/04
[52] U.S. Cl. .................. 250/484.4; 250/584
[58] Field of Search .................. 250/484.4, 584, 585; 378/162, 165

[56] References Cited

U.S. PATENT DOCUMENTS

| | | | |
|---|---|---|---|
| 4,258,264 | 3/1981 | Kotera et al. | 250/585 |
| 4,498,005 | 2/1985 | Oono et al. | 250/484.4 |
| 4,591,922 | 5/1986 | Takano et al. | 250/584 |
| 4,739,480 | 4/1988 | Oono et al. | 250/584 |
| 5,127,031 | 6/1992 | Yurosko | 378/165 |
| 5,136,626 | 8/1992 | Ort | 378/165 |
| 5,189,683 | 2/1993 | Fabian | 378/162 |

FOREIGN PATENT DOCUMENTS 56-11395 2/1981 Japan .

*Primary Examiner*—Constantine Hannaher
*Attorney, Agent, or Firm*—Sughrue, Mion, Zinn, Macpeak & Seas

[57] ABSTRACT

A cassette for a radiation image storage panel comprises a box member for housing a radiation image storage panel therein. The box member is provided with an opening, through which the radiation image storage panel is to be fed into and out of the box member. A cover member opens and closes the opening. A small window is formed in either one of the box member and the cover member. An identification mark put on the radiation image storage panel having been housed in the box member is read through the small window from the exterior of the cassette. A lead-containing, plate-like member, which is substantially transparent, closes the small window. The plate-like member is releasably engaged with the small window, and the small window is provided with a protective cover, which covers the plate-like member.

4 Claims, 2 Drawing Sheets

CASSETTE FOR RADIATION IMAGE STORAGE PANELS

BACKGROUND OF THE INVENTION

1. Field of the Invention

This invention relates to a cassette for housing a radiation image storage panel therein. This invention particularly relates to a cassette provided with a small window, which is closed by a plate-like member containing lead and through which an identification mark put on the radiation image storage panel housed in the cassette is read.

2. Description of the Prior Art

X-ray photographic film has heretofore been known as a recording medium, on which a radiation image of an object, such as a human body, is recorded. Also, as a recording medium used for the same purposes, a sheet provided with a layer of a stimulable phosphor (hereinafter referred to as a radiation image storage panel or a stimulable phosphor sheet) has heretofore been known. Such radiation image storage panels are disclosed in, for example, U.S. Pat. Nos. 4,258,264 and Japanese Unexamined Patent Publication No. 56(1981)-11395. When certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays, such as visible light, light is emitted by the phosphor in proportion to the amount of energy stored thereon during its exposure to the radiation. A phosphor exhibiting such properties is referred to as a stimulable phosphor.

A radiation image of an object is recorded on a radiation image storage panel by, for example, exposing the radiation image storage panel to radiation, which has passed through the object. The radiation image storage panel, on which the radiation image has been stored, is then scanned two-dimensionally with stimulating rays, such as a laser beam, which cause it to emit light in proportion to the amount of energy stored during exposure to the radiation. The light emitted by the radiation image storage panel, upon stimulation thereof, is photoelectrically detected. In this manner, an electric image signal representing the radiation image can be obtained.

By way of example, the radiation image storage panel or the X-ray photographic film described above is housed in a light-tight cassette, or a plurality of radiation image storage panels or plurality of sheets of X-ray photographic film are housed in a light-tight magazine. Each cassette serves to house a single panel-or sheet-shaped image recording medium, such as a radiation image storage panel, therein. In general, the cassette is constituted of a box member provided with an opening, through which a recording medium is to be fed into and out of the box member, at least at a portion, and a cover member, which opens and closes the opening. Also, a lead sheet for preventing back scattering of the radiation is secured to the entire area of the internal surface of the box member, which stands facing the back surface of the image recording medium.

In general, in cases where the cassette is used during a radiation image recording operation, the radiation image storage panel, or the like, on which a radiation image has been stored, is kept in the cassette, thereby prevented from being exposed to external light, and conveyed in this state into a darkroom.

In cases where radiation images of objects are recorded on radiation image storage panels, it is actually very important to control the radiation image storage panels, on which the radiation images of the objects have been recorded, in association with information giving specifics about the objects (e.g., in cases where the objects are patients, the name of each patient, the date of birth of each patient, and the like). However, for example, in cases where the radiation image recording operations are carried out for a large number of objects as in mass medical examinations, or the like, considerable time and labor are required to control the radiation image storage panels, on which the radiation images of the objects have been recorded, in association with the information giving specifics about the objects. Therefore, as disclosed in, for example, U.S. Pat. No. 4,498,005, a technique has been proposed wherein an identification mark is put on a radiation image storage panel and is detected with an optical means, a magnetic means, or the like, from the exterior of the cassette which houses the radiation image storage panel, the control of the radiation image storage panel being thereby facilitated.

Specifically, a label, or the like, having an identification mark, such as a bar code, is secured to the back surface of the radiation image storage panel (i.e. the surface opposite to the surface provided with a stimulable phosphor layer). Alternatively, an identification mark is directly put on the back surface of the radiation image storage panel. The radiation image storage panel is then housed in a cassette. A small window, through which the identification mark is to be read from the exterior of the cassette, is formed in the surface of the cassette, which surface stands facing the identification mark put on the radiation image storage panel. It is made clear which identification mark corresponds to which information giving specifics about the object. In this manner, the radiation image storage panel is easily controlled in association with the information giving specifics about the object. Also, by detecting the identification mark through the small window, it is possible to confirm that the radiation image storage panel has been housed in the cassette.

However, if the small window is merely formed in the back surface of the cassette in the manner described above, a lead sheet for preventing back scattering of radiation cannot be secured to the small window. Therefore, back scattering of the radiation occurs, and the image quality of the radiation image recorded on the radiation image storage panel cannot be kept high.

Accordingly, in cases where a cassette is provided with a small opening in the manner described above, the small opening is ordinarily closed by a plate-like member, such as a glass plate or a resin plate, which is substantially transparent and contains lead for preventing back scattering of the radiation.

The plate-like member, which is constituted of glass or a resin containing lead and secured to the cassette for the radiation image storage panel, is markedly weaker than glass and resins which are used for ordinary viewing windows. Therefore, the plate-like member is easily broken by small impact force. In order to prevent the plate-like member from breaking, close attention must heretofore be paid to the processing of the cassette.

Also, ordinarily, the plate-like member is secured by an adhesive to the cassette. Therefore, when the plate-like member breaks, fragments of the plate-like member and the adhesive remaining in the cassette must be removed completely, and thereafter a new plate-like member must be secured to the cassette. Considerable time and labor have heretofore been required to exchange the plate-like member with a new one.

SUMMARY OF THE INVENTION

The primary object of the present invention is to provide a cassette for a radiation image storage panel, wherein a plate-like member containing lead, which closes a small window, does not break easily during ordinary processing of the cassette.

Another object of the present invention is to provide a cassette for a radiation image storage panel, which is provided with a plate-like member such that the plate-like member may be easily exchanged with a new one.

The cassette for a radiation image storage panel in accordance with the present invention is characterized by covering a plate-like member containing lead, which closes a small window and is comparatively weak, with a protective cover in order to prevent the plate-like member from directly receiving external force. The cassette for a radiation image storage panel in accordance with the present invention is also characterized by releasably setting the plate-like member with respect to the cassette such that the plate-like member can be easily exchanged with a new one.

Specifically, the present invention provides a cassette for a radiation image storage panel, comprising:

i) a box member for housing a radiation image storage panel therein, the box member being provided with an opening, through which the radiation image storage panel is to be fed into and out of the box member, ii) a cover member, which opens and closes the opening, iii) a small window, which is formed in either one of the box member and the cover member and through which an identification mark put on the radiation image storage panel having been housed in the box member is to be read from the exterior of the cassette, and iv) a plate-like member, which is substantially transparent, contains lead, and closes the small window, wherein the plate-like member is releasably engaged with the small window, and the small window is provided with a protective cover, which covers the plate-like member.

With the cassette for a radiation image storage panel in accordance with the present invention, the protective cover covers the plate-like member containing lead and prevents the plate-like member from directly receiving external force. Therefore, the plate-like member containing lead, which is comparatively weak, can be prevented from being easily broken.

Also, the plate-like member is releasably engaged with the small window, which is formed in either one of the box member and the cover member. Therefore, even if the plate-like member is broken due to breakage of the protective cover or markedly large impact force exerted to the cassette body, the problems will not occur in that fragments of the plate-like member or an adhesive remains in the cassette. Therefore, the plate-like member can be easily exchanged with a new one.

As described above, with the cassette for a radiation image storage panel in accordance with the present invention, the plate-like member can be prevented from being easily broken. Also, the operation for exchanging the plate-like member with a new one can be carried out easily.

DESCRIPTION OF THE PREFERRED EMBODIMENTS

The present invention will hereinbelow be described in further detail with reference to the accompanying drawings.

Figure 1A:
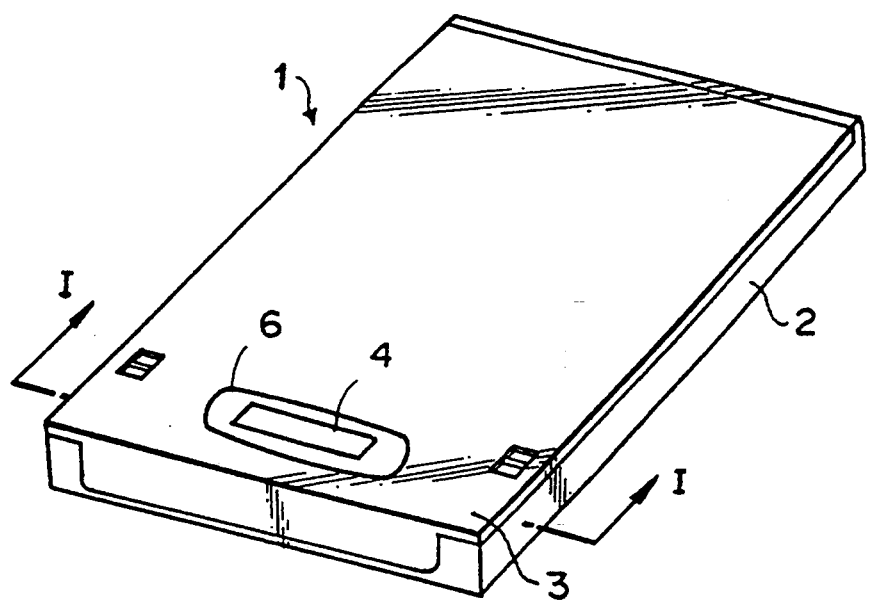
FIG. 1A is a perspective view showing an embodiment of the cassette for a radiation image storage panel in accordance with the present invention.
Figure 1B:
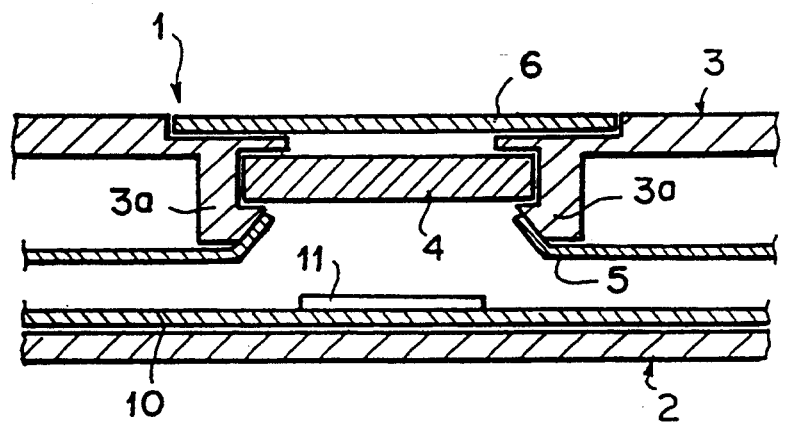
FIG. 1B is a sectional view taken along line I—I of FIG. 1A.

FIG. 1A is a perspective view showing an embodiment of the cassette for a radiation image storage panel in accordance with the present invention. FIG. 1B is a sectional view taken along line I—I of FIG. 1A. With reference to FIGS. 1A and 1B, a cassette 1 for a radiation image storage panel comprises a box member 2 provided with an opening, through which a radiation image storage panel 10 is to be fed into and out of the box member 2 and which is formed over the entire area of the back surface of the box member 2. The cassette 1 also comprises a cover member 3 which opens and closes the opening of the box member 2. An identification label 11, on which a bar code for identifying the radiation image storage panel 10 has been printed, is secured to the back surface of the radiation image storage panel 10 housed in the box member 2. The back surface of the radiation image storage panel 10 is opposite to the side of the radiation image storage panel 10 provided with a stimulable phosphor layer.

The cover member 3 is provided with a small window at the position which stands facing the identification label 11 secured to the radiation image storage panel 10 having been housed in the box member 2. Small protrusions 3a, 3a having claws are formed on the inner side of the small window. A plate-like, lead-containing glass 4 which is substantially transparent is engaged with the small protrusions 3a, 3a in order to close the small window. A protective cover 6, which is constituted of a transparent resin, such as an acrylic resin, is adhered by a double-faced adhesive tape to the cover member 3. The protective cover 6 is located on the side outward from the lead-containing glass 4 and is spaced approximately 1.5 mm apart from the lead-containing glass 4. Also, a lead sheet 5 is secured to the inner surface of the cover member 3, which stands facing the back surface of the radiation image storage panel 10 opposite to the side of the radiation image storage panel 10 provided with the stimulable phosphor layer and which is other than the opening of the small window. The lead sheet 5 prevents the back scattering of radiation, which is irradiated from the side of the front surface of the box member 2 towards the back surface of the box member 2.

How this embodiment operates will be described hereinbelow.

When external force is given to the position corresponding to the lead-containing glass 4, the external force is received by the protective cover 6, which covers the lead-containing glass 4 on the side outward from the lead-containing glass 4. Therefore, the external force is not directly given to the lead-containing glass 4. The protective cover 6 constituted of an acrylic resin, or the like, has a higher breaking strength than that of the lead-containing glass 4. With the cassette 1 in accordance with the present invention, when external force is given to the position corresponding to the lead-containing glass 4, the external force is first received by the protective cover 6. Only after the external force breaks the protective cover 6, the external force will be given to the lead-containing glass 4. Therefore, the lead-containing glass 4 can be prevented from being broken easily. However, with a conventional cassette, if a small external force is given to the position corresponding the lead-containing glass 4, the lead-containing glass 4 will break easily.

In cases where the external force breaks the protective cover 6 and then breaks the lead-containing glass 4, a new lead-containing glass 4' (not shown) can be easily inserted into the cover member 3 by being pushed into the region inside of the space defined by the small protrusions 3a, 3a of the cover member 3. Therefore, the lead-containing glass 4 can be easily exchanged with a new one.

Each of the small protrusions 3a, 3a may be provided with slits extending parallel to the plane of the sheet of FIG. 1B, and the rigidity of each of the small protrusions 3a, 3a can thereby be kept small. In such cases, when the lead-containing glass 4 is exchanged with a new one, the small protrusions 3a, 3a can be easily bent outwardly, and the exchanging operation can thereby be facilitated.

Figure 2:
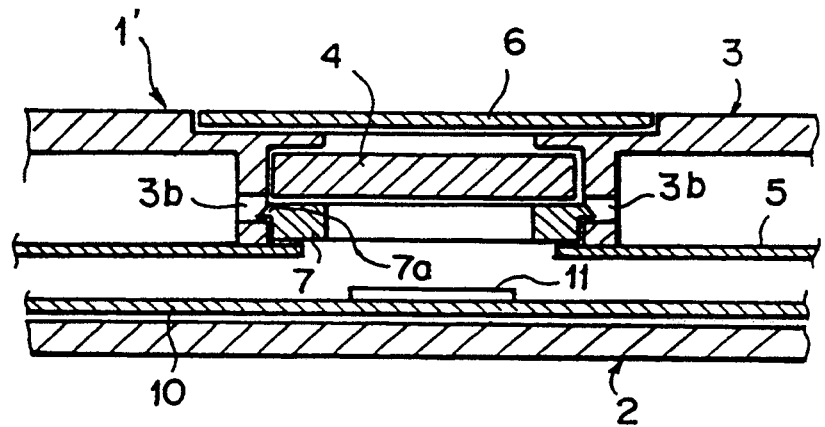
FIG. 2 is a sectional view taken along line I—I of FIG. 1A and showing a different embodiment of the cassette for a radiation image storage panel in accordance with the present invention.

In the aforesaid embodiment, the cover member 3 is provided with the small protrusions 3a, 3a, and the plate-like member containing lead is engaged with the small protrusions 3a, 3a. Alternatively, in cassette 1', which is another embodiment of the invention as illustrated in FIG. 2, through holes 3b, 3b may be formed in ribs, which define the location of the lead-containing glass 4 in the cover member 3. In the embodiment of FIG. 2, a push member 7 having small protrusions 7a, 7a pushes the lead-containing glass 4, which has been located in the cover member 3, against the back surface of the cover member 3. At this time, the small protrusions 7a, 7a are engaged with the through holes 3b, 3b of the cover member 3. In this manner, the lead-containing glass 4 is set in the cover member 3. As another alternative, the plate-like member containing lead may be secured by screws to the cover member.

Figure 1C:
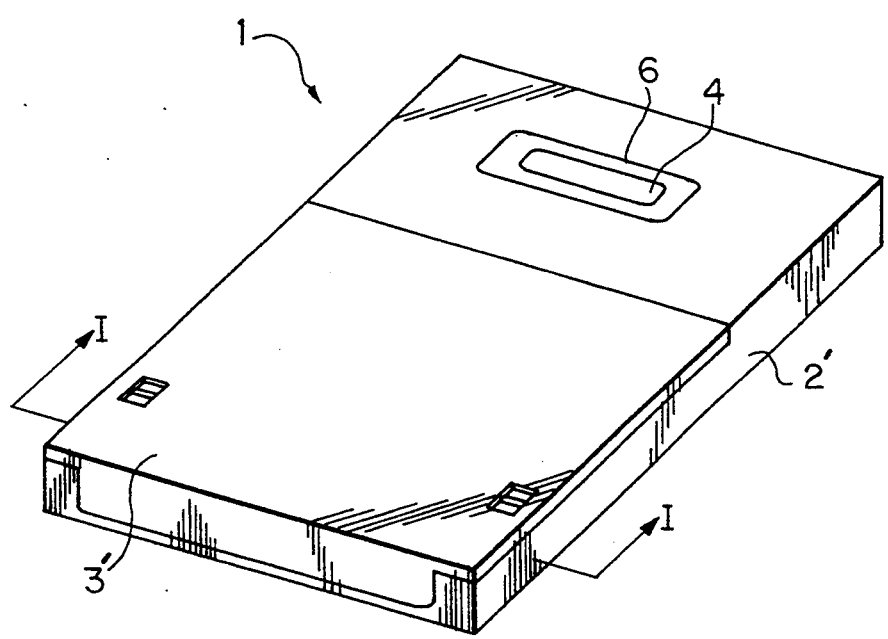
FIG. 1C is a perspective view showing another embodiment of the cassette in accordance with the present invention.

In the embodiments described above, the opening of the box member 2, through which the radiation image storage panel 10 is to be fed into and out of the box member 2, is formed over the entire area of the back surface of the box member 2. Alternatively, as shown in FIG. 1C, the box member may be configured as box member 2' wherein the opening is formed only at a portion of the back surface of the box member an covered by cover 3'. Also, the opening may be formed at a portion of the side wall of the box member. In such cases, the small window is formed in either one of the cover member and the box member, and the member provided with the small window is provided with the small protrusions or the through holes as in the embodiments described above. The plate-like member is releasably set in the small window by utilizing the small protrusions or the through holes. The protective cover for covering the plate-like member is located on the cover member or the box member, which is provided with the small window.

What is claimed is:

1. A cassette for a radiation image storage panel, comprising:
    i) a box member for housing a radiation image storage panel therein, the box member being provided with an opening, through which the radiation image storage panel is to be fed into and out of the box member,
    ii) a cover member, which opens and closes the opening,
    iii) a small window, which is formed in either one of the box member and the cover member and through which an identification mark put on the radiation image storage panel having been housed in the box member is to be read from the exterior of the cassette, and
    iv) a plate-like member, which is substantially transparent, contains lead, and closes the small window, wherein the plate-like member is releasably engaged with the small window, and the small window is provided with a protective cover, which covers the plate-like member.

2. A cassette as defined in claim 1 wherein the plate-like member is constituted of glass.

3. A cassette as defined in claim 1 wherein the plate-like member is constituted of a resin.

4. A cassette as defined in claim 1 wherein the protective cover is constituted of a resin.

* * * * *